Oct. 19, 1926.  
T. C. WAY  
1,603,434

BRAKE SHOE OF RAILWAY AND THE LIKE VEHICLES

Original Filed Feb. 29, 1924

INVENTOR

TOM CHERRILL WAY,

By his Attorneys,

Patented Oct. 19, 1926.

1,603,434

UNITED STATES PATENT OFFICE.

TOM CHERRILL WAY, OF WIMBLEDON, LONDON, ENGLAND.

BRAKE SHOE OF RAILWAY AND THE LIKE VEHICLES.

Original application filed February 29, 1924, Serial No. 695,961, and in Great Britain March 5, 1923. Divided and this application filed March 9, 1926. Serial No. 93,510.

This application is a division of my application No. 695,961 filed Feb. 29. 1924.

This invention relates to brake shoes for use with railway and the like vehicles in which the tread of the tyres is considerably wider than the head of the rail and consequently the greatest wear of the tyre is caused at the middle part of the tread so that the tyres assume a concave contour. Owing to the slight lateral movement of the tyres on the rails a worn tyre causes the head of the rail also to wear to a curved form, the edges of the rail being frequently crushed by the concave tyre tread.

The object of this invention is to dispose the surface lengths of the different parts of a brake shoe, and consequently their durability, so as to be approximately in proportion to the amount of wear to which they are subjected by abrasion from the tyre surface with which they are brought into contact, and thereby to prevent the consequent inequality of pressure between shoe and tyre at different parts of the width of the surfaces in contact.

It is almost invariable practice in steam and electric railway working to provide each wheel with two shoes, the shoes being usually mounted directly on the ends of the brake beams. In some cases, however, one shoe is provided for each wheel.

According to this invention, in cases where one shoe only is provided for a wheel, the shoe is so formed that its central part is of less length than the two edges. This may be effected by cutting away a V shaped part or one at each end of a rectangular shoe. Two such shoes may be used on one wheel if desired.

The shoes described above may also be fitted with grooved parts for engaging with the flanges of the tyres, as are described in the specification of my former Patent No. 1,434,464.

The amount of splay and the amount that the sides of the V shaped parts are cut away depend on the conditions of working and cannot be stated generally but similar conditions as set out in my former specification apply.

The accompanying drawings illustrate brake shoes made in accordance with this invention.

Figure 1:
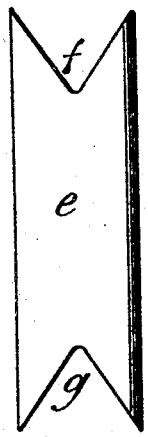
Figure 2:
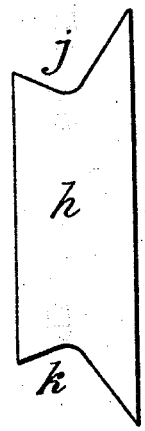

Figure 1 is a plan of a brake shoe having a central part of less length than the two edges formed by the cut away two V shaped parts, and Figure 2 is a plan of a similar shoe in which one side of the cut away parts is longer than the other.

Figure 1 shows a shoe $e$ which is employed when only one shoe is provided for a wheel and which has two V shaped slots $f$ and $g$ formed in it so that the central part of the shoe $e$ is of less length than the two edges. The shoe $h$ shown in Figure 2 is similar to that shown in Figure 1 except that V shaped slots $j$ and $k$ have one side longer than the other so that the amount of wear on the two sides of the tyre is different.

What I claim is:—

1. In railway and other vehicles, the combination of a tire and a brake shoe of the same width as the tire tread, having a central part of less length than the two edges.

2. In railway and other vehicles, the combination of a tire and a brake shoe of the same width as the tire tread having a V-shaped slot which renders the central part of less length than the two edges.

3. In railway and other vehicles, the combination of a tire and a brake shoe of the same width as the tire tread having a V-shaped slot, one side of which is longer than the other, rendering the central part of less length than the two edges.

In testimony that I claim the foregoing as my invention, I have signed my name this 24th day of February, 1926.

TOM CHERRILL WAY.